(12) United States Patent  (10) Patent No.: US 9,383,599 B2
Yuan et al.  (45) Date of Patent: Jul. 5, 2016

(54) DISPLAY MODULE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jing Yuan, Beijing (CN); Xiong Jin, Beijing (CN); Fei Wang, Beijing (CN); Ling Wang, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 85 days.

(21) Appl. No.: 14/494,841

(22) Filed: Sep. 24, 2014

(65) Prior Publication Data

US 2015/0362787 A1  Dec. 17, 2015

(30) Foreign Application Priority Data

Jun. 11, 2014 (CN) .......................... 2014 1 0258200

(51) Int. Cl.
*G02F 1/1333* (2006.01)
*G02F 1/1335* (2006.01)

(52) U.S. Cl.
CPC .... *G02F 1/133308* (2013.01); *G02F 1/133524* (2013.01); *G02F 2001/13332* (2013.01); *G02F 2201/465* (2013.01); *G02F 2201/503* (2013.01)

(58) Field of Classification Search
CPC ................................................ G02F 1/133308
See application file for complete search history.

(56) References Cited

U.S. PATENT DOCUMENTS

| 2005/0062899 | A1* | 3/2005 | Fukayama | ........ G02F 1/133308 349/58 |
| 2005/0094039 | A1 | 5/2005 | Kim et al. | |
| 2013/0258240 | A1* | 10/2013 | Yu | ..................... G02F 1/133608 349/61 |
| 2013/0286556 | A1* | 10/2013 | Kuo | .................. G02F 1/133308 361/679.01 |
| 2014/0028950 | A1* | 1/2014 | Wang | ................ G02F 1/133308 349/58 |

FOREIGN PATENT DOCUMENTS

| CN | 102269887 A | 12/2011 |
| CN | 203190337 U | 9/2013 |
| CN | 203442617 U | 2/2014 |
| CN | 103792706 A | 5/2014 |
| CN | 203595876 U | 5/2014 |
| CN | 103901642 A | 7/2014 |

OTHER PUBLICATIONS

Office Action in Chinese Patent Application No. 201410258200.7, dated Mar. 23, 2106.

* cited by examiner

*Primary Examiner* — James Dudek
(74) *Attorney, Agent, or Firm* — Baker Hostetler LLP

(57) ABSTRACT

The present disclosure provides a display module, comprising a light guide plate; a display panel arranged on one side of the light guide plate; a fixing element capable of being fixed on a peripheral edge of the display panel; a backboard arranged on one side of the light guide plate far away from the display panel; and a rubber frame arranged on the periphery of the light guide plate, wherein the rubber frame is connected and fixed to the backboard, and further engageably connected to the fixing element so as to fix the display panel.

18 Claims, 2 Drawing Sheets

DISPLAY MODULE

CROSS-REFERENCE TO RELATED APPLICATION

This application claims priority to the Chinese application No. 201410258200.7 filed on Jun. 11, 2014 and entitled with "display module", the entire contents of which are incorporated herein by reference.

TECHNICAL FIELD

The present disclosure relates to the field of display technology, in particular to a display module.

BACKGROUND

A liquid crystal display module comprises a display panel and a backlight module. As shown in FIG. 1, the backlight module in a conventional liquid crystal display module mainly comprises a backboard 10, metallic front frame 20, a rubber frame 30, an optimal film material 40, a light guide plate 50, a LED lamp bar, etc., wherein the display panel is fixed via the metallic front frame 20. Because the metallic front frame 20 deforms to press the display panel or the display panel deforms itself, the phenomenon of oppressive light leakage occurs, thereby influencing the good rate in volume production seriously.

SUMMARY

An object of the present disclosure is to provided a display module, which can solve the technical problem of oppressive light leakage of a display panel brought from a metallic front frame of a liquid crystal display module in the prior art.

A technical solution that the present disclosure provides is as follows:

A display module, comprising:

a light guide plate;

a display panel arranged on one side of the light guide plate;

a fixing element capable of being fixed on a peripheral edge of the display panel;

a backboard arranged on one side of the light guide plate far away from the display panel; and a rubber frame arranged on the periphery of the light guide plate, wherein the rubber frame is connected and fixed to the backboard, and further engageably connected to the fixing element so as to fix the display panel.

Further, the fixing element comprises a first portion arranged at the peripheral edge position of the back of the display panel in a manner of overlapping with the display panel so as to be fixedly connected to the display panel, and a second portion extending to a periphery direction of the display panel from the first portion;

the rubber frame comprises a supporting portion arranged on one side of the first portion far away from the display panel in a manner of overlapping with the first portion so as to support the display panel, and a connecting portion extending to the peripheral direction of the display panel from the supporting portion, wherein the connecting portion is provided with a recess matching with the second portion, and the second portion is plug-in mounted to the recess so as to connect and fix the fixing element to the rubber frame.

Further, the fixing element comprises a first portion arranged at the peripheral edge position of the back of the display panel in a manner of overlapping with the display panel so as to be fixedly connected to the display panel, and a second portion extending to a periphery direction of the display panel from the first portion;

the rubber frame comprises a supporting portion arranged on one side of the first portion far away from the display panel in a manner of overlapping with the first portion so as to support the display panel, and a connecting portion extending to the peripheral direction of the display panel from the supporting portion, wherein a recess with an opening toward the peripheral direction of the display panel is arranged on the second portion of the fixing element, a protrusion part protruding toward a direction of the display panel is arranged on the connection portion of the rubber frame, the protrusion part capable of being plug-in mounted to the recess on the second portion of the fixing element so as to fix the fixing element to the rubber frame.

Further, the fixing element is made of plastics.

Further, both the first portion and the second portion of the fixing element have a sheet structure.

Further, the first portion has a thickness less than that of the second portion.

Further, the second portion has an elastic buckle structure, the buckle structure being plug-in mounted to the recess of the rubber frame for hook connecting.

Further, between the first portion and the supporting portion is provided with an elastic cushion.

Further, the fixing element is fixedly connected to the display panel in an adhesive way.

Further, the rubber frame is arranged into four segments, the four segments of the rubber frame surround the periphery of the light guide plate, and two adjacent segments of the rubber frame are detachably connected.

Further, one of the two adjacent segments of the rubber frame is provided with a link slot on an end, the other one of the two adjacent segments of the rubber frame is provided with a link block matching with the link slot on an end, the link block being inserted into the link slot, and the link slot and the link block are provided with a throughhole, into which a fastener is passed so as to fix the two segments of the rubber frame.

Further, the rubber frame is detachably connected to the backboard.

Further, at least one part of the backboard is a peripheral part located on the periphery of the light guide plate, and the peripheral part is provided with a hook; the rubber frame is provided with a stuck slot at a position corresponding to the hook, and the hook is engageably connected to the stuck slot so as to detachably connect and fix the rubber frame to the backboard.

Further, at least one part of the backboard is a peripheral part located on the periphery of the light guide plate, and the peripheral part is provided with a stuck slot; the rubber frame is provided with a hook at a position corresponding to the stuck slot, and the hook is engageably connected to the stuck slot so as to detachably connect and fix the rubber frame to the backboard. A display device comprising the above display module.

The present disclosure has the following advantageous effects:

In the display module according to the present disclosure, the rubber frame is fixedly connected to the backboard, and the display panel is fixedly connected to the rubber frame via the fixing element so that the display panel can be fixed to a backlight module without an extra front frame structure. This achieves no front frame in the display module, and could completely avoid the oppressive light leakage of the display panel resulted from uneven metallic front frame in the prior art, and there is no front frame outside the display surface of the display panel, which increase efficient display area of the display module.

In a preferable technical solution of the present disclosure, the fixing element is a fixing sheet with a sheet structure. the first portion of the fixing element adhesively fixed to the display panel, and the second portion of the fixing element located on the periphery of the display panel are all sheet, and the second portion with a sheet structure is inserted directly into a corresponding recess on the rubber frame so that the fixing of the display panel can be realized. Convenient assembly and simple structure are better for the display module to have a thin structure.

DETAILED DESCRIPTION

The principle and features of this disclosure will be described hereafter in conjunction with the drawings. All examples are for explaining the present disclosure other than limiting the range thereof.

The present disclosure provides a display module, which has a simple structure without a metallic front frame and can solve the technical problem of oppressive light leakage of a display panel brought from the metallic front frame of a liquid crystal display module in the art.

Figure 1:
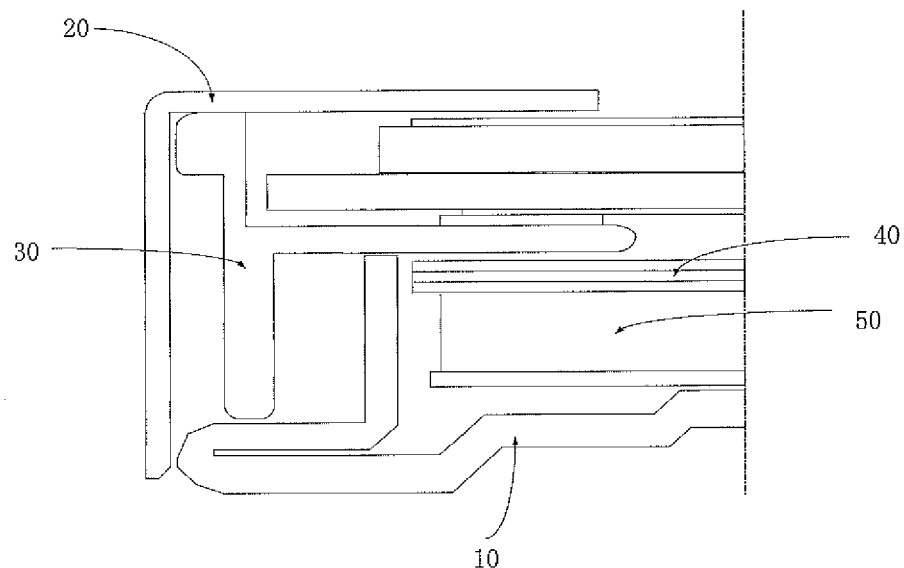
FIG. 1 is a schematic sectional view showing a partial structure of a conventional liquid crystal display module.
Figure 2:
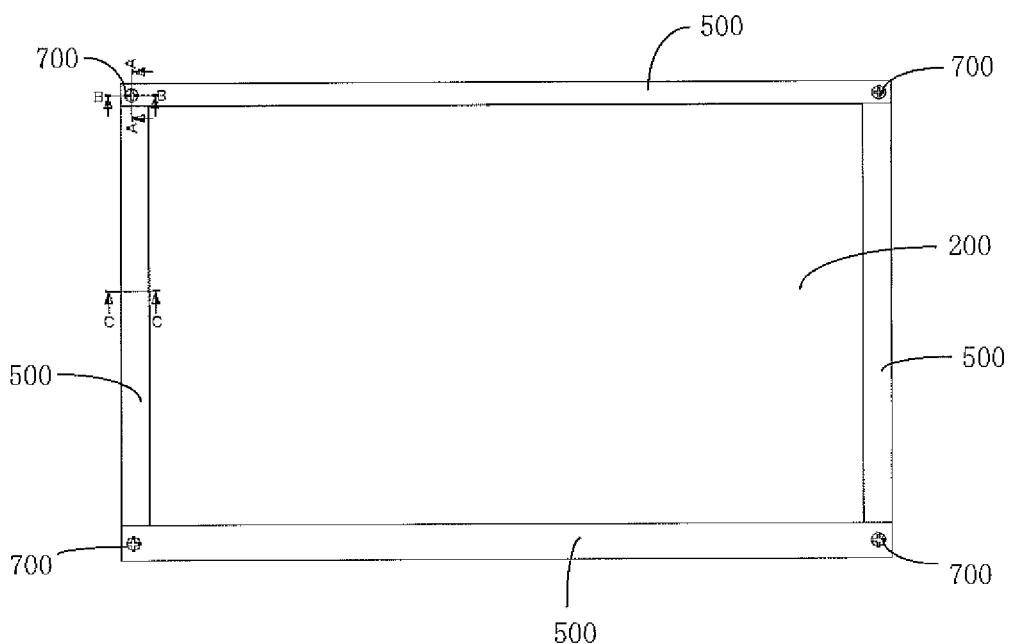
FIG. 2 is a schematic view showing a display module according to the present disclosure.
Figure 3:
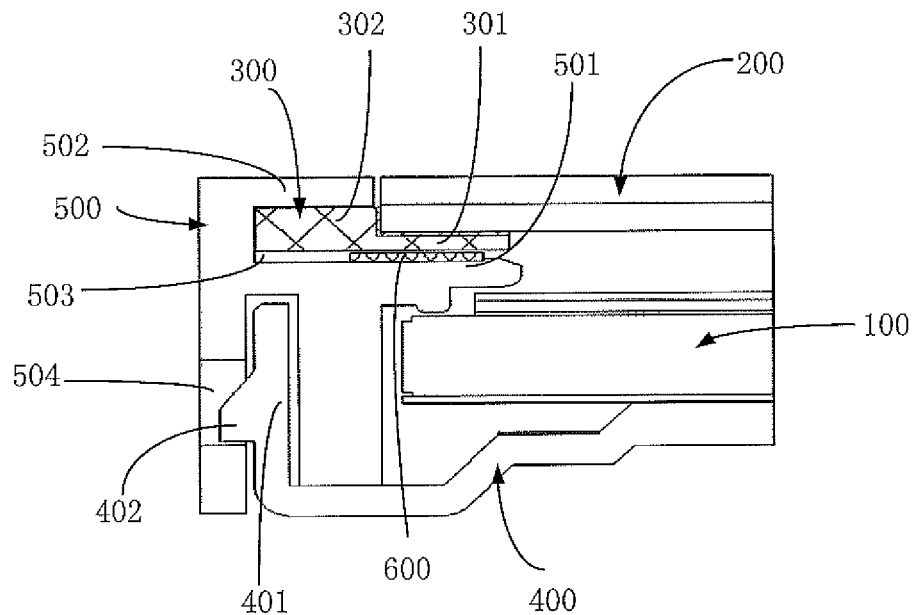
FIG. 3 is a sectional view along the direction C-C as shown in FIG. 2.
Figure 4:
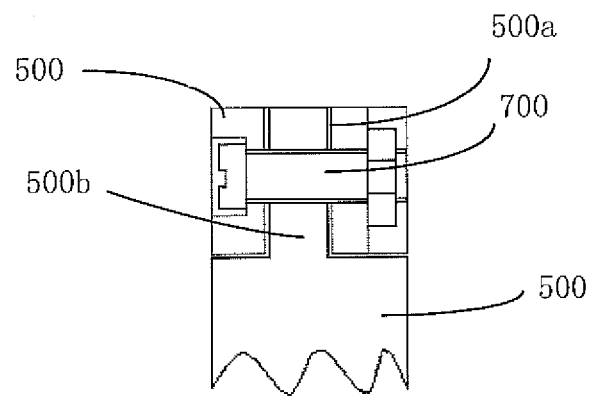
FIG. 4 is a sectional view along the direction A-A as shown in FIG. 2.
Figure 5:
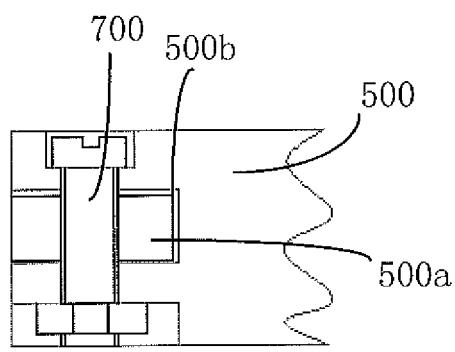
FIG. 5 is a sectional view along the direction B-B as shown in FIG. 2.

As shown in FIGS. 2 and 3, the display module according to the present disclosure comprises:
a light guide plate 100;
a display panel 200 arranged on one side of the light guide plate 100;
a fixing element 300 capable of being fixed on a peripheral edge of the display panel 200;
a backboard 400 arranged on one side of the light guide plate 100 far away from the display panel 200; and
a rubber frame 500 arranged on the periphery of the light guide plate 100, wherein the rubber frame 500 is connected and fixed to the backboard 400, and further engageably connected to the fixing element 300 so as to fix the display panel 200.

In the above solution, the rubber frame 500 is fixedly connected to the backboard 400, and the display panel 200 is fixedly connected to the rubber frame 500 via the fixing element 300 so that the display panel 200 can be fixed to a backlight module without an extra front frame structure, enabling the display module to have no front frame and thereby avoiding oppressive light leakage resulted from the metallic front frame deforms or the display panel deforms itself. Moreover, in a conventional display device, in order to fix a display panel to a backlight module, a non-display area outside an effective display area of the display panel has an overlapping area with the metallic front frame, thus it needs to preserve a certain distance between the effective display area of the display panel and the edge thereof, but the display device according to the present disclosure has no metallic front frame, and the display panel can be located on an outermost layer, thus there is no need to preserve a position on the edge of the display panel for the overlapping area of the metallic frame and the display panel, capable of increasing the effective display area of the display module.

The preferred embodiment of a display module according to the present disclosure will be explained below.

As shown in FIG. 3, in the embodiment, as an example, the fixing element 300 comprises a first portion 301 arranged at a peripheral edge position of the back of the display panel 200 in a manner of overlapping with the display panel 200 so as to be fixedly connected to the display panel 200, and a second portion 302 extending to a periphery direction of the display panel 200 from the first portion 301;

the rubber frame 500 comprises a supporting portion 501 arranged on one side of the first portion 301 far away from the display panel 200 in a manner of overlapping with the first portion 301 so as to support the display panel 200, and a connecting portion 502 extending to the peripheral direction of the display panel 200 from the supporting portion 501, wherein the connecting portion 502 is provided with a recess 503 matching with the second portion 302 of the fixing element, and the second portion 302 of the fixing element is plug-in mounted to the recess 503 so as to fix and connect the fixing element 300 to the rubber frame 500.

In the above solution, the first portion 301 of the fixing element 300 is located between the display panel 200 and the supporting portion 501 of the rubber frame 500, and can be fixedly connected to the display panel 200 in an adhesively fixing manner and supported by the supporting portion 501 of the rubber frame 500. The second portion 302 of the fixing element 300 protrudes to the periphery of the display panel 200, and the connecting portion 502 on the rubber frame 500 also protrudes to the periphery of the display panel 200. Moreover, the recess 503 with an opening toward the display panel 200 is arranged on the connecting portion 502 of the rubber frame 500, and the fixed connection between the fixing element 300 and the rubber frame 500 is realized by way of the recess 503 being plug-in mounted to the second portion 302. As the second portion 302 of the fixing element 300 and the connecting portion 502 of the rubber frame 500 are located on the periphery of the display panel 200, it is possible to have enough space on the periphery of the light guide plate 100 to realize fixing while realizing no front frame in the display module, but this will not influence the area of the effective display area of the display panel 200.

Of course, as can be understood, in the practically application, the way of fixing the fixing element 300 to the rubber frame 500 is not merely limited to this, but can also use other structures. For example, a recess with an opening toward the peripheral direction of the display panel 200 is arranged on the second portion 302 of the fixing element 300, and a protrusion part protruding toward the direction of the display panel 200 is arranged on the connection portion 502 of the rubber frame 500, the protrusion part capable of being plug-in mounted to the recess on the second portion 302 of the fixing element 300 so as to fix the fixing element 300 to the rubber frame 500.

Further, in the embodiment, as an example, as shown in FIG. 3, both the first portion 301 and the second portion 302 of the fixing element 300 have a sheet structure. In the above solution, the fixing element 300 is a fixing sheet with a sheet structure, the first portion 301 of the fixing element 300 adhesively fixed to the display panel 200, and the second portion 302 of the fixing element 300 located on the periphery of the display panel 200 are all sheet, and the second portion with a sheet structure is inserted directly into the corresponding recess 503 on the rubber frame 500 so that the fixing of the display panel 200 can be realized. Convenient assembly and simple structure are better for the display module to have a thin structure. Of course, as can be understood, the structure of the fixing element 300 is not merely limited to this, but can use other structures, for example, the second portion 302 has an elastic buckle structure, and can be plug-in mounted to the recess 503 of the rubber frame 500 for hook connection, which are not illustrated again herein.

Further, as an example, the fixing element 300 can be made of plastic materials such as polythene, and a part contacting with the display panel 200 will not lead to hard oppression to the display panel 200.

Further, as an example, as shown in FIG. 3, the first portion 301 of the fixing element has a thickness less than the second portion 302. Using above solution, the first portion 301 of the fixing element is provided between the supporting portion 501 and the display panel 200, and it is quite thin in thickness, which helps to the thinness of the display module, but the second portion 302 of the fixing element has a thickness greater than the first portion 301, capable of increasing strength on one hand. On the other hand, because the display panel 200 has a certain thickness, the rubber frame 500 can be substantially flush with a display surface of the display panel 200 so as to be more beautiful after the second portion 302 of the fixing element is engaged with the recess 503 of the rubber frame 500. Of course, as can be understood, in the practical application, the structure of the fixing element 300 may not be merely limited to this, for example, both the first portion 301 and the second portion 302 of the fixing element are sheet, and they can have the same thickness.

Further, in the embodiment, as an example, as shown in FIG. 3, between the first portion 301 of the fixing element and the supporting portion 501 is provided with an elastic cushion 600. The arrangement of the elastic cushion 600 may allow the recess 503 of the rubber frame 500 to be engaged with the second portion 302 of the fixing element 300 closely without occurrence of looseness on one hand, and on the other hand, the elastic cushion 600 can have an elastic buffer action. The elastic cushion 600 may alternatively use a siliceous gasket.

Further, in the embodiment, as an example, the fixing member 300 is fixedly connected to the display panel 200 in an adhesive way. It is possible to use a double sided tape to adhesively fix the first portion 301 of the fixing element 300 and the display panel 200. Of course, the way for fixing the fixing element 300 and the display panel 200 is not merely limited to this.

Further, in the embodiment, as an example, as shown in FIGS. 2 and 3, the rubber frame 500 is rectangular and has four segments. The four segments of the rubber frame 500 surround the periphery of the light guide plate 100, with an area surrounded being a rectangle, and two adjacent segments of the rubber frame 500 are detachably connected. Using the above solution, the rubber frame 500 is a combined type rubber frame 500, and after the fixing elements 300 on the periphery of the display panel 200 are all inserted into the corresponding recesses 503 of the rubber frame 500, the four segments of the rubber frame 500 are combined together using fasteners so that the display panel 200 is fixed to the rubber frame 500. The assembly thereof is convenient.

As shown in FIGS. 2 to 5, the rubber frame 500 has four segments with four corners connected via the fasteners (for example, screws). To be specific, one of the two adjacent segments of the rubber frame 500 is provided with a link slot 500a on an end, the other one is provided with a link block 500b matching with the link slot 500a on an end, the link block 500b being inserted into the link slot 500a, and the link slot 500a and the link block 500b are provided with a through-hole, into which a fastener 700 is passed so as to fix the two segments of the rubber frame 500. Of course, as can be understood, in the practical application, the way for fixing the four segments of the rubber frame is not merely limited to this.

Further, in the embodiment, as an example, the rubber frame 500 is detachably connected to the backboard 400.

Further, as an example, as shown in FIG. 3, at least one part of the backboard 400 is a peripheral part 401 located on the periphery of the light guide plate 100, and the peripheral part 401 is provided with a hook 402;

The rubber frame 500 is provided with a stuck slot 504 at a position corresponding to the hook 402, and the hook 402 is engageably connected to the stuck slot 504 with a clearance so as to detachably connect and fix the rubber frame 500 to the backboard 400.

Using the above solution, after the fixing elements 300 on the periphery of the display panel 200 are inserted into the corresponding recesses 503 of the rubber frame 500 respectively, ends of the four segments of the rubber frame 500 are assembled via four fasteners 700 so that the display panel 200 is fixed to the rubber frame 500, and then the rubber frame 500 is buckle connected to the backboard 400 so that the display panel 200 is fixed to the backlight module.

Of course, as can be understood, the way for fixing the rubber frame 500 to the backboard 400 is not merely limited to this, for example, a stuck slot is arranged on the backboard 400, and a hook is arranged at a corresponding position of the rubber frame 500, which are not enumerated herein again.

The above is only preferred embodiment of the disclosure. It should be noted that, for one of ordinary skills in the art, many improvements and modifications can be made without departing from the principle of the disclosure, and all these improvements and modifications fall into the protection scope of the disclosure.

What is claimed is:

1. A display module, comprising:
   a light guide plate;
   a display panel arranged on one side of the light guide plate;
   a fixing element capable of being fixed on a peripheral edge of the display panel;
   a backboard arranged on one side of the light guide plate far away from the display panel; and
   a rubber frame arranged on the periphery of the light guide plate,
   wherein the rubber frame is connected and fixed to the backboard, and further engageably connected to the fixing element so as to fix the display panel,
   wherein the fixing element comprises a first portion arranged at the peripheral edge position of the back of the display panel in a manner of overlapping with the display panel so as to be fixedly connected to the display panel, and a second portion extending to a periphery direction of the display panel from the first portion; and
   wherein the rubber frame further comprises a supporting portion arranged on the one side of the first portion far away from the display panel in a manner overlapping with the first portion so as to support the display panel with the connecting portion extending to the peripheral direction of the display panel from the supporting portion.

2. The display module according to claim 1, wherein the connecting portion is provided with a recess matching with the second portion, and the second portion is plug-in mounted to the recess so as to connect and fix the fixing element to the rubber frame.

3. The display module according to claim 1, wherein a recess with an opening toward the peripheral direction of the display panel is arranged on the second portion of the fixing element, a protrusion part protruding toward a direction of the display panel is arranged on the connection portion of the rubber frame, the protrusion part capable of being plug-in mounted to the recess on the second portion of the fixing element so as to fix the fixing element to the rubber frame.

4. The display module according to claim 2, wherein the fixing element is made of plastics.

5. The display module according to claim 4, wherein both the first portion and the second portion of the fixing element have a sheet structure.

6. The display module according to claim 5, wherein the first portion has a thickness less than that of the second portion.

7. The display module according to claim 4, wherein the second portion has an elastic buckle structure, the buckle structure being plug-in mounted to the recess of the rubber frame for hook connecting.

8. The display module according to claim 3, wherein the fixing element is made of plastics.

9. The display module according to claim 8, wherein both the first portion and the second portion of the fixing element have a sheet structure.

10. The display module according to claim 9, wherein the first portion has a thickness less than that of the second portion.

11. The display module according to claim 2, wherein between the first portion and the supporting portion is provided with an elastic cushion.

12. The display module according to claim 1, wherein the fixing element is fixedly connected to the display panel in an adhesive way.

13. The display module according to claim 1, wherein the rubber frame is arranged into four segments, the four segments of the rubber frame surround the periphery of the light guide plate, and two adjacent segments of the rubber frame are detachably connected.

14. The display module according to claim 13, wherein one of the two adjacent segments of the rubber frame is provided with a link slot on an end, the other one of the two adjacent segments of the rubber frame is provided with a link block matching with the link slot on an end, the link block being inserted into the link slot, and the link slot and the link block are provided with a through-hole, into which a fastener is passed so as to fix the two segments of the rubber frame.

15. The display module according to claim 1, wherein the rubber frame is detachably connected to the backboard.

16. The display module according to claim 15, where at least one part of the backboard is a peripheral part located on the periphery of the light guide plate, and the peripheral part is provided with a hook;
the rubber frame is provided with a stuck slot at a position corresponding to the hook, and the hook is engageably connected to the stuck slot so as to detachably connect and fix the rubber frame to the backboard.

17. The display module according to claim 15, wherein at least one part of the backboard is a peripheral part located on the periphery of the light guide plate, and the peripheral part is provided with a stuck slot;
the rubber frame is provided with a hook at a position corresponding to the stuck slot, and the hook is engageably connected to the stuck slot so as to detachably connect and fix the rubber frame to the backboard.

18. A display device comprising the display module according to claim 1.

* * * * *